(12) United States Patent
Isahaya et al.

(10) Patent No.: US 9,499,661 B2
(45) Date of Patent: *Nov. 22, 2016

(54) PROCESS FOR PRODUCING HIGHLY POLYMERIZED AROMATIC POLYCARBONATE RESIN

(71) Applicant: MITSUBISHI GAS CHEMICAL COMPANY, INC., Tokyo (JP)

(72) Inventors: Yoshinori Isahaya, Tokyo (JP); Atsushi Hirashima, Tokyo (JP); Hidefumi Harada, Tokyo (JP); Maki Ito, Tokyo (JP); Jun-ya Hayakawa, Tokyo (JP); Takehiko Isobe, Tokyo (JP); Taichi Tokutake, Nishitokyo (JP); Yousuke Shinkai, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,939

(22) PCT Filed: Nov. 15, 2013

(86) PCT No.: PCT/JP2013/080867
§ 371 (c)(1),
(2) Date: May 11, 2015

(87) PCT Pub. No.: WO2014/077350
PCT Pub. Date: May 22, 2014

(65) Prior Publication Data
US 2015/0274887 A1 Oct. 1, 2015

(30) Foreign Application Priority Data

Nov. 17, 2012 (JP) .................................. 2012-252793

(51) Int. Cl.
| | | |
|---|---|---|
| C08G 64/42 | (2006.01) | |
| C08G 64/06 | (2006.01) | |
| C08G 64/38 | (2006.01) | |
| C08G 64/30 | (2006.01) | |
| C08G 64/16 | (2006.01) | |
| C08G 64/04 | (2006.01) | |

(52) U.S. Cl.
CPC ............ C08G 64/06 (2013.01); C08G 64/04 (2013.01); C08G 64/1608 (2013.01); C08G 64/30 (2013.01); C08G 64/307 (2013.01); C08G 64/38 (2013.01); C08G 64/42 (2013.01)

(58) Field of Classification Search
None
See application file for complete search history.

(56) References Cited

U.S. PATENT DOCUMENTS

| | | | |
|---|---|---|---|
| 3,535,280 A | 10/1970 | Schnell et al. | |
| 5,521,275 A | 5/1996 | McCloskey et al. | |
| 5,696,222 A | 12/1997 | Kaneko et al. | |
| 6,300,459 B1 | 10/2001 | Kaneko et al. | |
| 6,399,738 B1* | 6/2002 | Ito ........................... | C08G 64/36 528/196 |
| 8,674,053 B2 | 3/2014 | Isahaya et al. | |
| 8,969,505 B2 | 3/2015 | Isahaya et al. | |
| 2002/0032299 A1* | 3/2002 | Matsumoto .......... | C08G 64/307 528/196 |
| 2013/0197166 A1 | 8/2013 | Isahaya et al. | |
| 2014/0206826 A1* | 7/2014 | Isahaya ............... | C08G 64/1608 525/462 |
| 2015/0267006 A1 | 9/2015 | Isahaya et al. | |
| 2015/0284509 A1* | 10/2015 | Isahaya .................. | C08G 64/06 528/196 |
| 2015/0322203 A1 | 11/2015 | Isahaya et al. | |

FOREIGN PATENT DOCUMENTS

| | | |
|---|---|---|
| EP | 0 595 608 | 5/1994 |
| JP | 50-19600 | 7/1975 |
| JP | 2-153923 | 6/1990 |
| JP | 6-94501 | 11/1994 |
| JP | 3271353 | 1/2002 |
| JP | 3301453 | 4/2002 |
| JP | 3317555 | 6/2002 |
| JP | 4112979 | 4/2008 |
| JP | 2008-514754 | 5/2008 |
| JP | 4286914 | 4/2009 |
| JP | 2009-102536 | 5/2009 |
| WO | 2006-036545 | 4/2006 |
| WO | 2011/062220 | 5/2011 |
| WO | 2012/108510 | 8/2012 |
| WO | 2012/157766 | 11/2012 |
| WO | 2014/077342 | 5/2014 |
| WO | 2014/077351 | 5/2014 |

OTHER PUBLICATIONS

Search report from International Bureau of WIPO Application No. PCT/JP2013/080867, mail date is Dec. 10, 2013.
Office Action in respect to U.S. Appl. No. 14/441,956 (published as US 2015/0322203), dated Dec. 11, 2015.
Final Office Action in respect to U.S. Appl. No. 14/118,439 (published as US 2014/0206826 A1), dated Nov. 16, 2015.

* cited by examiner

*Primary Examiner* — David Buttner
(74) *Attorney, Agent, or Firm* — Greenblum & Bernstein, P.L.C.

(57) ABSTRACT

The invention provides a process for producing a highly polymerized aromatic polycarbonate resin including a molecular weight-increasing step of reacting an aromatic polycarbonate prepolymer with an aliphatic diol compound represented by Formula (g2) in the presence of a transesterification catalyst to obtain a highly polymerized aromatic polycarbonate resin. In the formula, Ra and Rb each independently represent a hydrogen atom, a halogen atom, a linear or branched alkyl group, a cycloalkyl group, an aryl group or an alkoxy group, or Ra and Rb may be bonded to each other to form a ring; $R_1$ to $R_4$ each independently represent a hydrogen atom, a halogen atom or an alkyl group; and n represents an integer of 0 to 30.

11 Claims, No Drawings

PROCESS FOR PRODUCING HIGHLY POLYMERIZED AROMATIC POLYCARBONATE RESIN

TECHNICAL FIELD

The present invention relates to a process for producing a highly polymerized aromatic polycarbonate resin. In particular, the invention relates to a process for producing a highly polymerized polycarbonate resin by reacting an aromatic polycarbonate with an aliphatic diol compound having a specific structure to increase the molecular weight of the aromatic polycarbonate while removing a cyclic carbonate that is by-produced.

BACKGROUND ART

Polycarbonates have excellent heat resistance, impact resistance and transparency, and in recent years are widely used in many fields.

There have been many studies of polycarbonate production processes. In industry, polycarbonates derived from aromatic dihydroxy compounds, for example, 2,2-bis(4-hydroxyphenyl)propane (hereinafter "bisphenol A"), are produced by an interfacial polymerization method or a melt polymerization method.

In the interfacial polymerization method, a polycarbonate is produced from bisphenol A and phosgene, but poisonous phosgene must be used. Other problems are that the apparatuses are corroded by chlorine-containing compounds such as hydrogen chloride and sodium chloride byproducts, and methylene chloride used in a large amount as the solvent, and that it is difficult to remove impurities such as sodium chloride and residual methylene chloride and consequently polymer properties are adversely affected.

On the other hand, as a method for producing polycarbonates from an aromatic dihydroxy compound and a diaryl carbonate, for example, it has been known a melt polymerization method from long ago in which bisphenol A and diphenyl carbonate are polymerized in a melt state by transesterification, while removing aromatic monohydroxy compounds that are by-produced. The melt polymerization method has advantages such as the freedom from the use of solvents in contrast to the interfacial polymerization method. However, the polymer viscosity in the system is rapidly increased with the progress of the polymerization to make it difficult to remove aromatic monohydroxy compound byproducts efficiently from the system. As a result, this method has an essential problem that the reaction rate is markedly decreased and thus increasing the polymerization degree is difficult.

To solve this problem, various approaches have been studied to withdraw aromatic monohydroxy compounds from the highly viscous polymer. For example, Japanese Patent Publication No. S50-19600 discloses a screw polymerizer having a vent section, and Japanese Patent Application Kokai Publication No. H02-153923 discloses the combined use of a thin-film evaporator and a horizontal polymerizer.

U.S. Pat. No. 5,521,275 discloses a process in which an aromatic polycarbonate is redistributed in the presence of a catalyst under reduced pressure conditions using an extruder having a polymer seal section and a vent section.

However, the processes disclosed in the above publications cannot sufficiently increase the molecular weight of polycarbonates. The polymerization using large amounts of catalysts or involving high-shear severe conditions causes a poor hue of the resins or marked adverse effects on the resins such as the occurrence of crosslinking reaction.

In the melt polymerization method, it is known that the polymerization degree of polycarbonates is increased by adding polymerization accelerators to the reaction system. The ability to increase the molecular weight in a short reactor residence time and at a low reaction temperature enhances the output of polycarbonates and consequently facilitates designing a simple and inexpensive reactor.

EP Patent No. 0595608 discloses a redistribution process involving the reaction of diaryl carbonates. However, a significant increase in molecular weight cannot be obtained. U.S. Pat. No. 5,696,222 discloses a process for producing a polycarbonate with a high polymerization degree which includes the addition of a specific polymerization accelerator, for example, an aryl carbonate or dicarboxylate ester compound such as bis(2-methoxyphenyl) carbonate, bis(2-ethoxyphenyl) carbonate, bis(2-chlorophenyl) carbonate, bis (2-methoxyphenyl) terephthalate or bis(2-methoxyphenyl) adipate. This patent literature 5 teaches that the use of the ester compound as a polymerization accelerator introduces ester bonds and results in a polyester carbonate copolymer (instead of a homopolymer) exhibiting low hydrolysis stability.

Japanese Patent No. 4112979 discloses a process in which an aromatic polycarbonate having an increased molecular weight is obtained by using salicyl carbonates in the reaction.

Japanese Patent Kohyo Publication No. 2008-514754 discloses a polymerization process which includes introducing components including a polycarbonate oligomer and a bissalicyl carbonate to an extruder.

Japanese Patent No. 4286914 discloses a process in which an aromatic polycarbonate is reacted with an active hydrogen compound (a dihydroxy compound) to increase the amount of terminal hydroxy groups and thereafter a salicylate ester derivative is added to couple the aromatic polycarbonate molecules having an increased amount of terminal hydroxy groups.

Due to the need of increasing the amount of terminal hydroxyl groups of the polycarbonate, the process disclosed in the above patent literature 8 involves a step of the reaction with an active hydrogen compound and a step of the reaction with a salicylate ester derivative. In addition to this complexity of the steps, there is a risk that properties may be lowered because of the fact that polycarbonates having a large number of terminal hydroxyl groups have poor thermal stability. Further, as generally known, increasing the amount of hydroxyl groups by the use of active hydrogen compounds induces a partial chain breakage reaction to cause the broadening of the molecular weight distribution. Furthermore, relatively large amounts of catalysts are required to obtain a sufficient reaction rate, and such heavy use of catalysts can possibly cause a decrease in properties during a forming process.

Several polycarbonate production processes involving the addition of diol compounds to the reaction system have been proposed. For example, Japanese Patent Publication No. H06-94501 discloses a process for producing a high-molecular polycarbonate by the introduction of 1,4-cyclohexanediol. In the process disclosed, 1,4-cyclohexanediol is added to the polycondensation reaction system together with an aromatic dihydroxy compound at an initial stage of the reaction. It is therefore considered that 1,4-cyclohexanediol is consumed (oligomerized) first in the polycarbonate-forming reaction and thereafter the oligomer is reacted with the aromatic dihydroxy compound to attain a high molecular weight. Thus, the reaction time tends to be relatively long and appearance properties such as hue tend to be poor.

Japanese Patent Application Kokai Publication No. 2009-102536 discloses a polycarbonate production process involving the copolymerization of a specific aliphatic diol and an ether diol. However, the polycarbonates disclosed in this publication have an isosorbide-based structure and thus fail to achieve high impact resistance required for aromatic polycarbonates.

Other approaches that have been proposed include the addition of cyclic carbonate compounds to the reaction system (for example, Japanese Patent No. 3271353), and the addition of diols having a hydroxyl group basicity equal to or higher than that of a dihydroxy compound used in the reaction (for example, Japanese Patents Nos. 3301453 and 3317555). However, any of these processes do not afford highly polymerized polycarbonate resins having fully satisfactory properties.

As discussed above, the conventional processes for the production of highly polymerized aromatic polycarbonates have many problems. Thus, demands still remain for an improved production process that can increase the molecular weight to a sufficient level while maintaining the good quality inherent to polycarbonates.

The present inventors have already developed a novel process capable of a high polymerization rate and of affording a quality aromatic polycarbonate. Specifically, the process is such that end-capped terminals of aromatic polycarbonate molecules are interconnected via an aliphatic diol compound to extend the chain length (WO 2011/062220). According to this process, capped ends of aromatic polycarbonate molecules are interconnected via an aliphatic diol compound to extend the chain length so that a highly polymerized aromatic polycarbonate resin having a weight average molecular weight (Mw) of about 30,000 to 100,000 may be produced in a short time. The ability to produce polycarbonates by polymerization reaction at a high rate suppresses the occurrence of branching and crosslinking reactions which are induced by factors such as prolonged exposure to high temperatures and also makes it possible to prevent resin degradations such as poor hue.

Further, the present inventors have proposed a process for producing a branched aromatic polycarbonate resin having a desired degree of branching, the process including a step of transesterifying an aromatic polycarbonate prepolymer having a branched structure with an aliphatic diol compound in the presence of a transesterification catalyst under reduced pressure conditions (WO 2012/108510).

Furthermore, the present inventors have proposed a polycarbonate copolymer which includes structural units derived from an aromatic polycarbonate prepolymer and structural units derived from an aliphatic diol compound (WO 2012/157766).

The conventional processes for the production of highly polymerized aromatic polycarbonates have many problems. Thus, there have been demands for the development of polycarbonate resins having a sufficiently high molecular weight while maintaining the good quality inherent to polycarbonates, and for the development of processes that can produce such highly polymerized polycarbonate resins.

DISCLOSURE OF INVENTION

Problems to be Solved by the Invention

An object of the present invention is to provide improved processes for the production of highly polymerized aromatic polycarbonate resins which can achieve a sufficiently high molecular weight while maintaining the good quality inherent to aromatic polycarbonate resins.

Means to Solve the Problems

The present inventors carried out extensive studies to achieve the above object. As a result, the present inventors have found that the molecular weight of an aromatic polycarbonate may be sufficiently increased by the reaction of the aromatic polycarbonate with a specific aliphatic diol compound in the presence of a transesterification catalyst. In combination with this configuration, the removal of at least part of a cyclic carbonate that is by-produced in the reaction from the reaction system has been found to afford a polycarbonate resin which not only has high molecular weight, high fluidity and excellent quality but also has substantially the same structure as synthesized by an interfacial method and exhibits good heat resistance. The present invention has been completed based on the findings.

Specifically, the present invention provides processes for producing highly polymerized aromatic polycarbonate resins described below.

(1) A process for producing a highly polymerized aromatic polycarbonate resin including a highly polymerizing step of increasing the molecular weight of an aromatic polycarbonate prepolymer by reacting the aromatic polycarbonate prepolymer with an aliphatic diol compound represented by the following Formula (g2) in the presence of a transesterification catalyst.

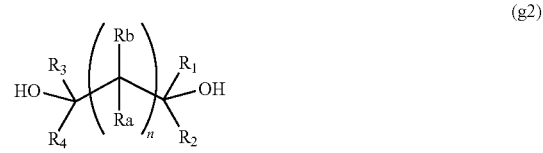

(g2)

In Formula (g2), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring; $R_1$ to $R_4$ each independently represent a hydrogen atom, a halogen atom, or a linear or branched alkyl group with 1 to 5 carbon atoms; and n represents an integer of 0 to 30.

(2) The production process described in (1), wherein n in Formula (g2) is an integer of 1 to 6.

(3) The production process described in (1) or (2), wherein the aliphatic diol compound represented by Formula (g2) is an aliphatic diol compound represented by the following Formula (g3).

(g3)

In Formula (g3), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring.

(4) The production process described in (3), wherein Ra and Rb in Formula (g3) each independently represent a hydrogen atom, a linear or branched alkyl group with 1 to 5 carbon atoms, or a phenyl group.

(5) The production process described in (3), wherein Ra and Rb in Formula (g3) each independently represents a linear or branched alkyl group with 1 to 4 carbon atoms.

(6) The production process described in (3), wherein the aliphatic diol compound represented by Formula (g3) is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

(7) The production process described in any one of (1) to (3), wherein Ra and Rb each independently represent a halogen atom, a linear or branched alkyl group with 1 to 30 carbon atoms having an oxygen atom or a halogen atom, a cycloalkyl group with 3 to 30 carbon atoms optionally having an oxygen atom or a halogen atom, an aryl group with 10 to 30 carbon atoms optionally having an oxygen atom or a halogen atom, or an alkoxy group with 1 to 15 carbon atoms optionally having an oxygen atom or a halogen atom.

(8) The production process described in any one of (1) to (3), wherein Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

(9) The production process described in any one of (1) to (8), further including a cyclic carbonate removal step of removing at least part of a cyclic carbonate by-produced in the molecular weight-increasing step to the outside of the reaction system, the cyclic carbonate being represented by the following Formula (h2).

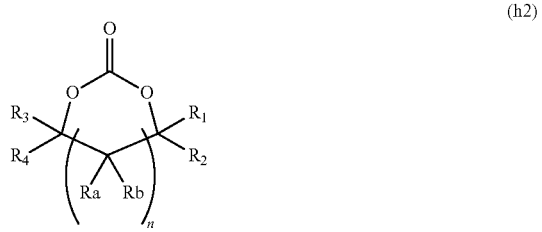

(h2)

In Formula (h2), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring; $R_1$ to $R_4$ each independently represent a hydrogen atom, a halogen atom, or a linear or branched alkyl group with 1 to 5 carbon atoms; and n represents an integer of 0 to 30.

(10) The production process described in (9), wherein the cyclic carbonate represented by Formula (h2) is a compound represented by the following Formula (h3).

(h3)

In Formula (h3), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring.

(11) The production process described in (9) or (10), wherein Ra and Rb each independently represent a halogen atom, a linear or branched alkyl group with 1 to 30 carbon atoms having an oxygen atom or a halogen atom, a cycloalkyl group with 3 to 30 carbon atoms optionally having an oxygen atom or a halogen atom, an aryl group with 10 to 30 carbon atoms optionally having an oxygen atom or a halogen atom, or an alkoxy group with 1 to 15 carbon atoms optionally having an oxygen atom or a halogen atom.

(12) The production process described in any one of (1) to (11), wherein the aliphatic diol compound is used in an amount of 0.01 to 1.0 mol per 1 mol of total terminal amount of the unreacted aromatic polycarbonate prepolymer before the reaction in the highly ploymerizing step.

(13) A highly polymerized aromatic polycarbonate resin obtained by the production process described in any one of (1) to (12).

(14) The highly polymerized aromatic polycarbonate resin described in (13), wherein the structural viscosity index or the N value represented by the following Equation (1) is not more than 1.25.

$$N \text{ value} = (\log(Q160) - \log(Q10))/(\log 160 - \log 10) \quad (1)$$

(15) A polycarbonate resin composition including the highly polymerized aromatic polycarbonate resin described in (13) or (14) and not more than 3000 ppm of a cyclic carbonate represented by the following Formula (h2).

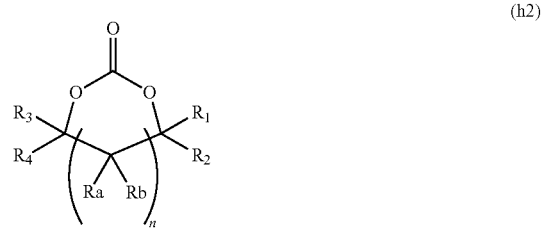

(h2)

In Formula (h2), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring; $R_1$ to $R_4$ each independently represent a hydrogen atom, a halogen atom, or a linear or branched alkyl group with 1 to 5 carbon atoms; and n represents an integer of 0 to 30.

(16) The polycarbonate resin composition described in (15), wherein the cyclic carbonate represented by Formula (h2) is a compound represented by the following Formula (h3).

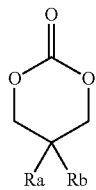

(h3)

In Formula (h3), Ra and Rb each independently represent a hydrogen atom, a halogen atom, a linear or branched alkyl group with 1 to 30 carbon atoms optionally having an oxygen atom or a halogen atom, a cycloalkyl group with 3 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, or Ra and Rb may be bonded to each other to form a ring.

(17) The polycarbonate resin composition described in claim 15 or 16, wherein Ra and Rb each independently represent a hydrogen atom, a halogen atom, a linear or branched alkyl group with 1 to 30 carbon atoms having an oxygen atom or a halogen atom, a group containing a cycloalkyl group with 3 to 30 carbon atoms optionally having an oxygen atom or a halogen atom, an aryl group with 10 to 30 carbon atoms optionally having an oxygen atom or a halogen atom, or an alkoxy group with 1 to 15 carbon atoms optionally having an oxygen atom or a halogen atom.

(18) The polycarbonate resin composition described in any one of (15) to (17), further including not less than 3 ppm of a catalyst deactivator.

(19) The polycarbonate resin composition described in (18), wherein the catalyst deactivator is selected from the group consisting of aromatic sulfonic acids, aromatic sulfonate esters, organic halides, alkyl sulfate salts, phosphoric acids and phosphorous acids.

(20) The polycarbonate resin composition described in (18), wherein the catalyst deactivator is selected from the group consisting of paratoluenesulfonic acid, butyl paratoluenesulfonate, tetrabutylphosphonium dodecylbenzenesulfonate salt and tetrabutylammonium paratoluenesulfonate salt.

Advantageous Effects of Invention

The improved production processes according to the present invention can produce highly polymerized aromatic polycarbonate resins having a sufficiently high molecular weight while maintaining the good quality inherent to aromatic polycarbonate resins.

BEST MODE FOR CARRYING OUT INVENTION

In the specification, the term "step" comprehends not only an independent step but also a combination of steps which are not distinct from one another as long as such combined steps can fulfill the desired purposes. Further, all the ranges of values indicated with the preposition "to" include the values before and after the preposition "to" as the minimum value and the maximum value. Furthermore, when a plurality of substances belong to any one component in a specific composition, the content of such a component in the composition means the total content of the plurality of substances present in the composition unless otherwise mentioned.

A process for producing a highly polymerized aromatic polycarbonate resin according to the invention includes a highly polymerizing step of increasing the molecular weight of an aromatic polycarbonate by reacting the aromatic polycarbonate with an aliphatic diol compound having a specific structure in the presence of a transesterification catalyst, thereby obtaining a highly polymerized aromatic polycarbonate resin.

In the reaction of an aromatic polycarbonate prepolymer with an aliphatic diol compound having a specific structure, the molecules of the aromatic polycarbonate prepolymer are interconnected into a higher molecular weight while substantially no structural units derived from the aliphatic diol compound remain in the main chains of the highly polymerized aromatic polycarbonate resin.

Thus, the resultant highly polymerized aromatic polycarbonate resin is such that substantially no interconnecting moieties remain in the molecular chains and the structure is substantially the same as an aromatic polycarbonate resin obtained by the conventional interfacial or melt method. When, for example, the aromatic polycarbonate prepolymer is one synthesized from bisphenol A (BPA) as the aromatic dihydroxy compound, the obtainable polymer has substantially the same chemical structure as a usual bisphenol A-derived polycarbonate resin (BPA-PC).

The highly polymerized aromatic polycarbonate resins obtained as described above are comparable in terms of properties to aromatic polycarbonate resins obtained by the conventional interfacial method, and also have quality advantages such as a small degree of branching and a small amount of heterologous structures because of the feature that the molecular weight is increased at high speed using the aliphatic diol compound as an interconnecting agent. Further, the absence of skeletons derived from the aliphatic diol compound as the interconnecting agent results in a marked improvement in thermal stability at high temperatures, that is heat resistance.

[1] Aliphatic Diol Compounds

The aliphatic diol compound is a dialcohol compound which has two alcoholic hydroxyl groups each bonded to a non-aromatic carbon atom. The aliphatic diol compounds include compounds having an aromatic ring moiety in the molecular structure, but exclude phenolic compounds having a hydroxyl group bonded to an aromatic ring.

The aliphatic diol compound used in the production process of the invention is represented by the following Formula (g2).

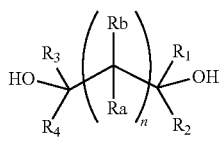

(g2)

In Formula (g2), Ra and Rb each independently represent a hydrogen atom, a halogen atom, a linear or branched alkyl group with 1 to 30 carbon atoms optionally having an oxygen atom or a halogen atom, a group containing a cycloalkyl group with 1 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, and Ra and Rb may be bonded to each other to form a ring. A preferred halogen atom is a fluorine atom.

$R_1$ to $R_4$ each independently represent a hydrogen atom or a halogen atom. A preferred halogen atom is a fluorine atom.

The letter n represents an integer of 0 to 30, preferably 1 to 6, more preferably 1 to 3, and particularly preferably 1.

Ra and Rb in Formula (g2) are more preferably each independently a hydrogen atom or a linear or branched alkyl group with 1 to 5 carbon atoms, and still more preferably a linear or branched alkyl group with 1 to 4 carbon atoms. Specifically, particularly preferred examples include methyl group, ethyl group, propyl group, n-butyl group and isobutyl group. $R_1$ to $R_4$ are more preferably each a hydrogen atom.

The aliphatic diol compounds represented by Formula (g2) are more preferably compounds represented by the following Formula (g3). In Formula (g3), Ra and Rb are the same as Ra and Rb in Formula (g2), respectively.

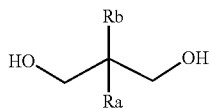

(g3)

Ra and Rb in Formula (g3) are more preferably each independently a hydrogen atom or a linear or branched alkyl group with 1 to 5 carbon atoms, still more preferably a linear or branched alkyl group with 1 to 4 carbon atoms, and further preferably a linear or branched alkyl group with 2 to 4 carbon atoms. Specifically, preferred examples include methyl group, ethyl group, propyl group, n-butyl group and isobutyl group, with ethyl group, propyl group, n-butyl group and isobutyl group being more preferable.

Examples of such aliphatic diol compounds include 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,2-diol, propane-1,3-diol, ethane-1,2-diol (1,2-ethylene glycol), 2,2-diisoamylpropane-1,3-diol and 2-methylpropane-1,3-diol.

The aliphatic diol compounds represented by Formula (g2) are preferably such that Ra and Rb each independently represent a halogen atom, a linear or branched alkyl group with 1 to 30 carbon atoms having an oxygen atom or a halogen atom, a cycloalkyl group with 3 to 30 carbon atoms optionally having an oxygen atom or a halogen atom, an aryl group with 10 to 30 carbon atoms optionally having an oxygen atom or a halogen atom, or an alkoxy group with 1 to 15 carbon atoms optionally having an oxygen atom or a halogen atom, or are more preferably such that Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

Examples of the aliphatic diol compounds further include compounds having the following formulae.

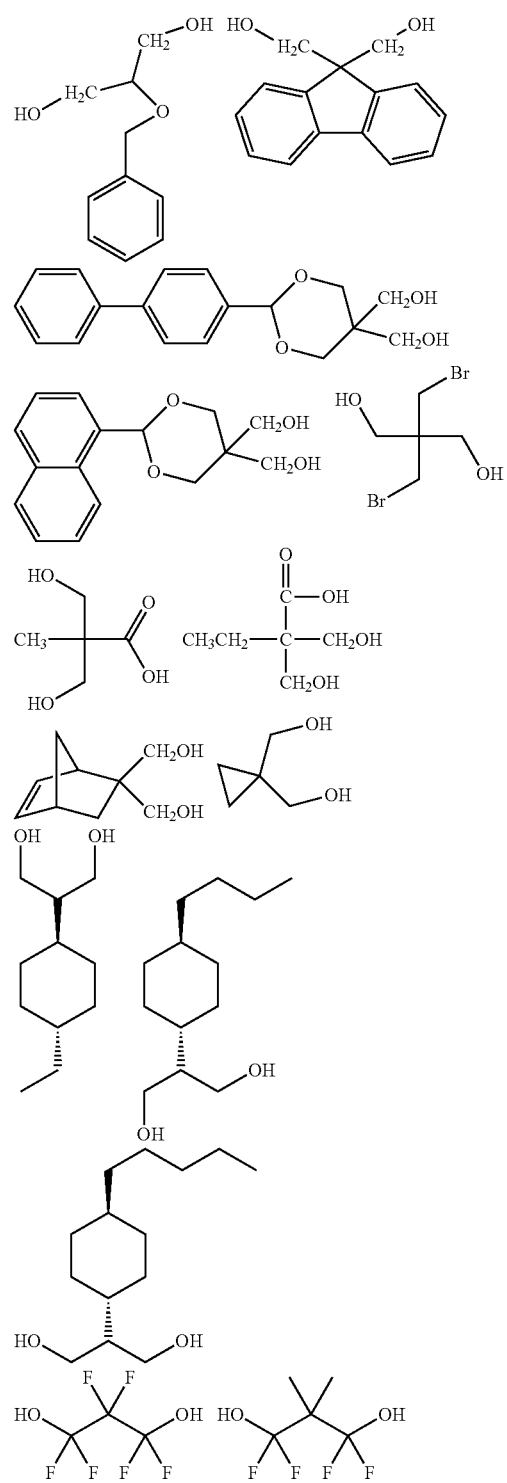

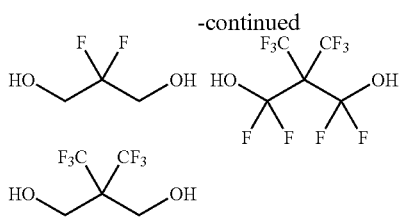

Of these, it is particularly preferable to use at least one compound selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

[2] Aromatic Polycarbonate Prepolymers

The aromatic polycarbonate prepolymer (hereinafter, also written simply as the "prepolymer") used in the process for producing a highly polymerized aromatic polycarbonate resin according to the invention is a polycondensed polymer including structures of the following Formula (II) as main repeating units. Here, the term "main" means that the content of the structural units represented by General Formula (II) in all the structural units of the aromatic polycarbonate prepolymer is 60 mol % or more, preferably 80 mol % or more, and more preferably 90 mol % or more.

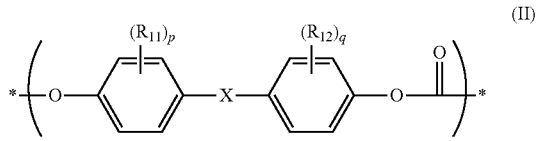

In Formula (II), $R_{11}$ and $R_{12}$ each independently represent a halogen atom, an alkyl group with 1 to 20 carbon atoms, an alkoxy group with 1 to 20 carbon atoms, a cycloalkyl group with 6 to 20 carbon atoms, an aryl group with 6 to 20 carbon atoms, a cycloalkoxy group with 6 to 20 carbon atoms, or an aryloxy group with 6 to 20 carbon atoms; p and q each represent an integer of 0 to 4; and X is a single bond or a group selected from the group shown in (II') below.

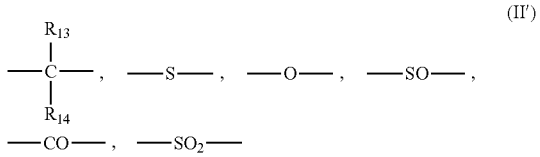

In Formula (II'), $R_{13}$ and $R_{14}$ each independently represent a hydrogen atom, an alkyl group with 1 to 10 carbon atoms, or an aryl group with 6 to 10 carbon atoms, or $R_{13}$ and $R_{14}$ may be linked to each other to form an aliphatic ring.

The production process of the invention includes a step of increasing the molecular weight of the aromatic polycarbonate prepolymer by transesterifying the aromatic polycarbonate prepolymer with the aliphatic diol compound having a structure represented by any of Formulae (g2) to (g3) under reduced pressure. With this configuration, the process can advantageously produce an aromatic polycarbonate resin in such a manner that the molecular weight of the polycarbonate is increased while ensuring high fluidity at the same time and further that the heat resistance is markedly enhanced without causing a decrease in the inherent characteristics of aromatic polycarbonate resins such as impact resistance.

The aromatic polycarbonate prepolymer may be easily obtained by a known transesterification method in which an aromatic dihydroxy compound as a source of structural units represented by Formula (II) is reacted with a carbonate diester in the presence of a basic catalyst, or a known interfacial polycondensation method in which the aromatic dihydroxy compound is reacted with a reagent such as phosgene in the presence of an acid binding agent.

Examples of the aromatic dihydroxy compounds as sources of structural units represented by Formula (II) include compounds represented by the following Formula (II").

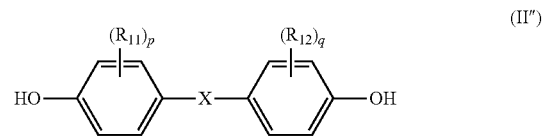

In Formula (II"), $R_{11}$, $R_{12}$, p, q and X are the same as $R_{11}$, $R_{12}$, p, q and X in Formula (II), respectively.

Specific examples of the aromatic dihydroxy compounds include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethyl phenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, 4,4'-dihydroxydiphenyl sulfone, and 4,4'-dihydroxy-3,3'-dimethyldiphenyl sulfone.

Of these, 2,2-bis(4-hydroxyphenyl)propane (BPA) is preferable for reasons such as stability of the monomer and high availability for its small content of impurities.

In the present invention, several types of the above monomers (the aromatic dihydroxy compounds) may be used in combination as required for such purposes as controlling the glass transition temperature, enhancing the fluidity, improving the refractive index, reducing the birefringence, and controlling optical properties.

The aromatic polycarbonate prepolymer used in the invention may be one synthesized by an interfacial polymerization method, a melt polymerization method, or other synthesis method such as a solid phase polymerization method or a thin-film polymerization method. It is also possible to use a polycarbonate recovered from wastes such as used discs. The aromatic polycarbonate prepolymer may be a mixture of such various polycarbonates. For example, a polycarbonate polymerized by an interfacial polymerization method and a polycarbonate polymerized by a melt polymerization method may be mixed with each other, or a polycarbonate polymerized by a melt polymerization method or an interfacial polymerization method may be mixed with a polycarbonate recovered from wastes such as used discs.

The aromatic polycarbonate prepolymer used in the invention may be preferably an end-capped aromatic polycarbonate prepolymer satisfying specific conditions.

Specifically, the aromatic polycarbonate prepolymer is preferably such that at least part of the molecular ends thereof are capped with a terminal group derived from an aromatic monohydroxy compound, or with a phenyl terminal group such as a phenyloxy group or a phenyloxycarbonyl group (hereinafter, all these terminal groups are also collectively referred to as the "end-capped terminal groups").

Marked effects may be obtained when the ratio of the end-capped terminal groups relative to total terminal amount is 60 mol % or more, preferably 90 mol % or more, and more preferably 95 mol % or more. The concentration of the end-capped terminal groups (the ratio of the end-capped terminal groups relative to all the structural units) is 2 mol % or more, preferably 2 to 20 mol %, and particularly preferably 2 to 12 mol %. With the concentration of the terminal phenyl groups being 2 mol % or more, the reaction with the aliphatic diol compound proceeds rapidly to provide marked specific effects of the present invention. The ratio of the capped molecular ends relative to all the molecular ends of the polymer may be determined by the $^1$H-NMR analysis of the polymer. The concentration of the end-capped terminal groups may be analyzed by pyrolysis gas chromatography.

The concentration of the terminal hydroxyl groups in the aromatic polycarbonate prepolymer may be measured by spectrometry with respect to a Ti complex or by $^1$H-NMR analysis. The concentration of the terminal hydroxyl groups is preferably 1,500 ppm or less, and more preferably 1,000 ppm or less. When the concentration of the terminal hydroxyl groups is in the above range or when the concentration of the end-capped terminal groups corresponds to the above range, the transesterification of the prepolymer with the aliphatic diol compound tends to result in a sufficiently high molecular weight.

For example, provided that the polycarbonate has no branches (namely, is a linear polymer) and its amount is 0.5 mol, "the total terminal amount of the polycarbonate" or "the total terminal amount of the aromatic polycarbonate prepolymer" is calculated to be 1 mol.

Specific examples of the end-capped terminal groups include such terminal groups as phenyl terminal groups (namely, phenyloxy groups or phenyloxycarbonyl groups), cresyl terminal groups, o-tolyl terminal groups, p-tolyl terminal groups, p-tert-butylphenyl terminal groups, biphenyl terminal groups, o-methoxycarbonylphenyl terminal groups, and p-cumylphenyl terminal groups.

Of these, preferred terminal groups are those composed of low-boiling aromatic monohydroxy compounds which are easily removed from the reaction system in the transesterification with the aliphatic diol compound, with particularly preferred examples including phenyl terminal groups and p-tert-butylphenyl terminal groups.

In the case of an interfacial polymerization method, such end-capped terminal groups may be introduced by the use of a chain terminator during the production of the aromatic polycarbonate prepolymer. Specific examples of the chain terminators include p-tert-butylphenol, phenol, p-cumylphenol and long-chain alkyl-substituted phenols. The amount of the chain terminator used may be appropriately determined in accordance with factors such as the desired amount of the molecular ends of the aromatic polycarbonate prepolymer (namely, the desired molecular weight of the aromatic polycarbonate prepolymer), the reaction apparatus and the reaction conditions.

In the case of a melt polymerization method, the end-capped terminal groups may be introduced by using the carbonate diester such as diphenyl carbonate in excess over the aromatic dihydroxy compound during the production of the aromatic polycarbonate prepolymer. Although variable depending on the reaction apparatus and the reaction conditions, specifically, the carbonate diester may be used in an amount of 1.00 to 1.30 mol, and more preferably 1.02 to 120 mol per 1 mol of the aromatic dihydroxy compound. This amount ensures that the obtainable aromatic polycarbonate prepolymer will satisfy the aforementioned amount of the end-capped terminal groups.

In the present invention, the aromatic polycarbonate prepolymer may be preferably an end-capped polycondensed polymer obtained by reacting (transesterifying) the aromatic dihydroxy compound with the carbonate diester.

The production of the aromatic polycarbonate prepolymer may involve a polyfunctional compound having 3 or more functional groups in the molecule in combination with the aromatic dihydroxy compound. Preferred examples of such polyfunctional compounds include compounds having reactive functional groups such as phenolic hydroxyl groups and carboxyl groups.

Further, the production of the aromatic polycarbonate prepolymer may involve a dicarboxylic acid compound in combination with the aromatic dihydroxy compound, thereby obtaining a polyester carbonate. Preferred examples of the dicarboxylic acid compounds include terephthalic acid, isophthalic acid, naphthalenedicarboxylic acid and 1,4-cyclohexanedicarboxylic acid. In the reaction, these dicarboxylic acids are preferably used in the form of acid chlorides or ester compounds. In the production of the polyester carbonate resin, the dicarboxylic acid is preferably used in the range of 0.5 to 45 mol %, and more preferably in the range of 1 to 40 mol % relative to the total of the dihydroxy component (the aromatic dihydroxy compound) and the dicarboxylic acid component taken as 100 mol %.

The molecular weight, specifically, the weight average molecular weight (Mw) of the aromatic polycarbonate prepolymer is preferably 5,000 to 60,000. More preferably, the Mw of the aromatic polycarbonate prepolymer is in the range of 10,000 to 50,000, and still more preferably 10,000 to 40,000.

If the aromatic polycarbonate prepolymer has a high molecular weight exceeding the above range, the high viscosity of the aromatic polycarbonate prepolymer itself may make it necessary that the prepolymer production entails high temperatures, high shearing and long time and/or that the reaction with the aliphatic diol compound entails high temperatures, high shearing and long time.

[3] Cyclic Carbonates

In the invention, the end-capped aromatic polycarbonate prepolymer is reacted with the aliphatic diol compound in the presence of a transesterification catalyst under reduced pressure conditions and thereby the aromatic polycarbonate prepolymer is polymerized into a higher molecular weight, namely, a highly polymerized aromatic polycarbonate resin is obtained. This reaction proceeds at a high rate under mild conditions to achieve an increase in molecular weight.

In the inventive process involving the reaction with the aliphatic diol compound which has the specific structure described above, a cyclic carbonate that is a cyclic byproduct having a structure corresponding to the structure of the aliphatic diol compound occurs with the progress of the reaction between the aromatic polycarbonate prepolymer and the aliphatic diol compound. Such a cyclic carbonate byproduct is removed to the outside of the reaction system to allow the molecular weight-increasing reaction of the aromatic polycarbonate prepolymer to further proceed, thus resulting in an aromatic polycarbonate resin having substantially the same structure as a conventional homopolycarbonate (for example, a homopolycarbonate resin derived from bisphenol A).

That is, the production process in a preferred embodiment of the invention includes a molecular weight-increasing step of increasing the molecular weight of the aromatic polycarbonate by the reaction of the aromatic polycarbonate with the aliphatic diol compound in the presence of a transesterification catalyst to obtain a highly polymerized aromatic polycarbonate resin, and a cyclic carbonate removal step of removing at least part of a cyclic carbonate by-produced in the molecular weight-increasing step to the outside of the reaction system.

The highly polymerizing step and the cyclic carbonate removal step may be physically and temporally separate steps or may be performed simultaneously. Preferably, these steps are performed at the same time. The production process in a preferred embodiment of the invention includes a step of reacting the aromatic polycarbonate with the aliphatic diol compound in the presence of a transesterification catalyst to increase the molecular weight of the polycarbonate while removing at least part of a cyclic carbonate by-produced during the molecular weight-increasing reaction to the outside of the reaction system.

The cyclic carbonates that are by-produced are compounds having a structure represented by the following Formula (h2).

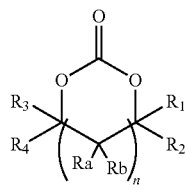

(h2)

In Formula (h2), Ra and Rb each independently represent a hydrogen atom, a halogen atom, a linear or branched alkyl group with 1 to 30 carbon atoms optionally having an oxygen atom or a halogen atom, a group containing a cycloalkyl group with 1 to 30 carbon atoms optionally having an oxygen atom or a halogen atom, an aryl group with 6 to 30 carbon atoms optionally having an oxygen atom or a halogen atom, or an alkoxy group with 1 to 15 carbon atoms optionally having an oxygen atom or a halogen atom, and Ra and Rb may be bonded to each other to form a ring. A preferred halogen atom is a fluorine atom.

$R_1$ to $R_4$ each independently represent a hydrogen atom or a halogen atom. A preferred halogen atom is a fluorine atom.

The n represents an integer of 0 to 30, preferably 1 to 6, more preferably 1 to 3, and particularly preferably 1.

Ra and Rb in Formula (h2) are more preferably each independently a hydrogen atom or a linear or branched alkyl group with 1 to 5 carbon atoms, and still more preferably a linear or branched alkyl group with 1 to 4 carbon atoms. Specifically, particularly preferred examples include methyl group, ethyl group, propyl group, n-butyl group and isobutyl group. $R_1$ to $R_4$ are more preferably each a hydrogen atom.

The cyclic carbonates represented by Formula (h2) are more preferably compounds represented by the following Formula (h3). In Formula (h3), Ra and Rb are the same as Ra and Rb in Formula (h2), respectively.

(h3)

Specific examples of the cyclic carbonates include compounds having the following structures.

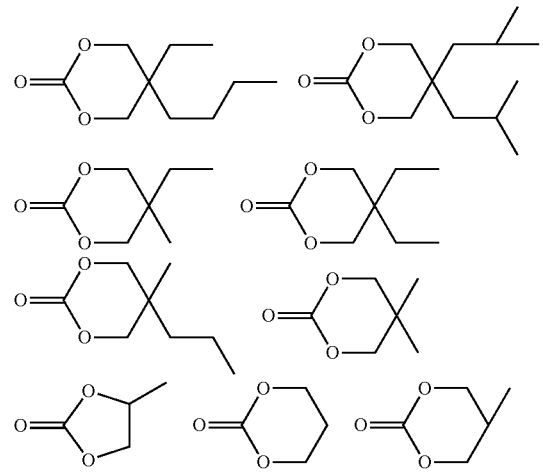

The cyclic carbonates represented by Formula (h2) represent preferably such that Ra and Rb each independently represent a halogen atom, a linear or branched alkyl group with 1 to 30 carbon atoms having an oxygen atom or a halogen atom, a cycloalkyl group with 3 to 30 carbon atoms optionally having an oxygen atom or a halogen atom, an aryl group with 10 to 30 carbon atoms optionally having an oxygen atom or a halogen atom, or an alkoxy group with 1 to 15 carbon atoms optionally having an oxygen atom or a halogen atom, or are more preferably such that Ra and Rb represent each independently a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

The production process involving the aliphatic diol compound with a structure represented by Formula (g2) can advantageously increase the molecular weight at a higher rate than the conventional polycarbonate production processes by a melt method. This advantage is similarly observed when a highly polymerized polycarbonate resin is obtained by interconnecting the molecules using other aliphatic diol compounds found by the present inventors as the interconnecting agents.

In the production process of the invention, a cyclic carbonate having a specific structure is by-produced with the progress of the molecular weight-increasing reaction. After such a cyclic carbonate byproduct is removed to the outside of the reaction system, a highly polymerized polycarbonate resin having substantially the same skeleton as a homopolycarbonate resin is obtained. The cyclic carbonate that is by-produced has a structure corresponding to the structure of the aliphatic diol compound used and is probably a cyclic byproduct derived from the aliphatic diol compound. However, the reaction mechanism is not fully clear as to how such a cyclic carbonate is by-produced with the progress of the molecular weight-increasing reaction.

Some examples of the possible mechanisms are illustrated in the following Schemes (1) and (2), but it is not necessarily clear that the mechanism is as such. The production process of the invention involving the aliphatic diol compound with a structure represented by Formula (g2) is such that the aliphatic diol compound as an interconnecting agent is reacted with the aromatic polycarbonate prepolymer to interconnect the molecules of the aromatic polycarbonate prepolymer into a higher molecular weight while removing a cyclic carbonate byproduct having a structure corresponding to the structure of the aliphatic diol compound. The process of the invention is not limited to any specific reaction mechanism as long as the reaction occurs in the above manner.

Scheme (1):

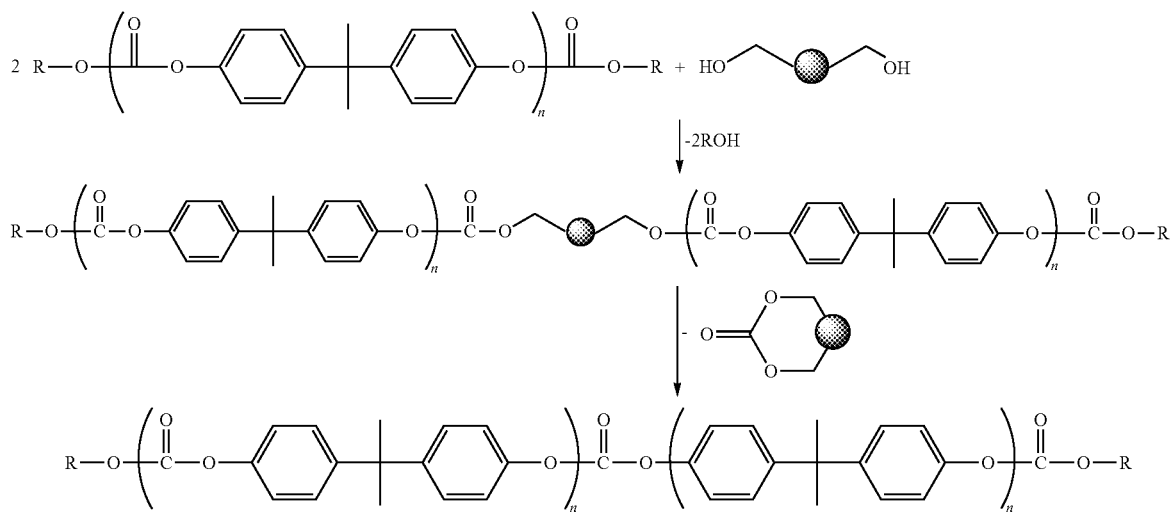

Scheme (2):

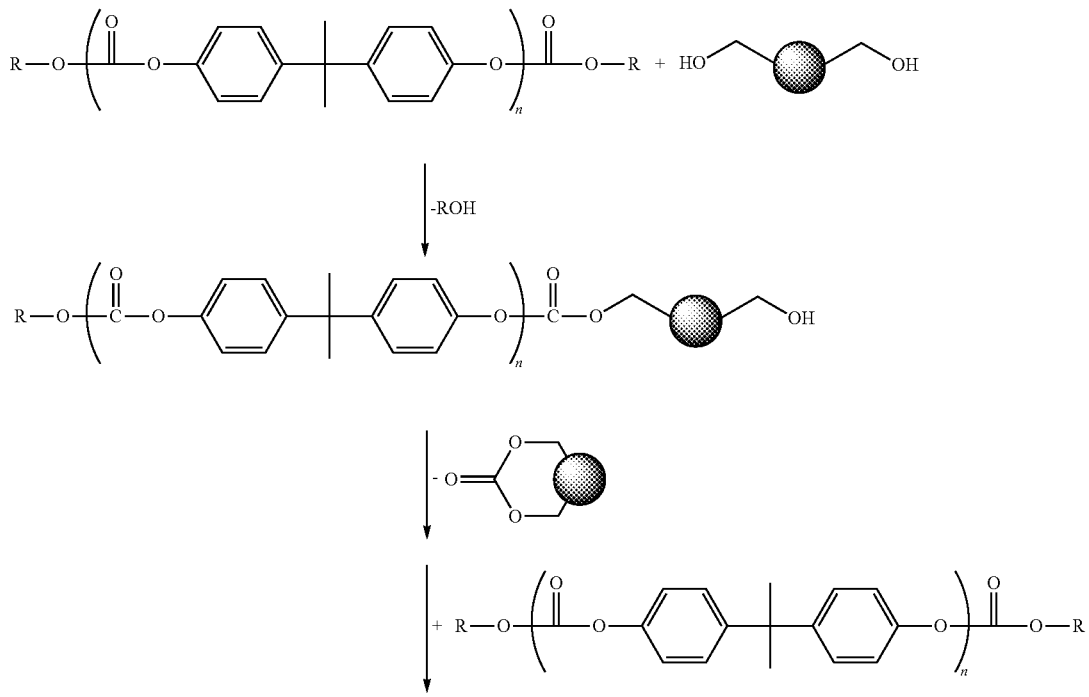

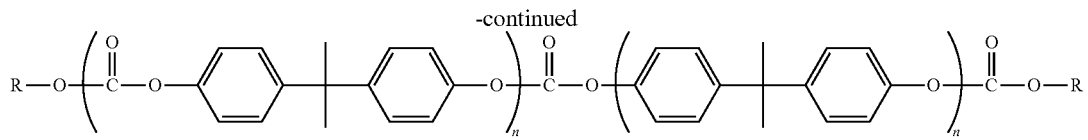

According to the production process involving the aliphatic diol compound with a structure represented by Formula (g2), the obtainable highly polymerized aromatic polycarbonate resin has few structural units derived from the aliphatic diol compound and the skeleton of the resin is substantially the same as a homopolycarbonate resin.

That is, the resin exhibits superior thermal stability and excellent heat resistance because the skeleton is free from or contains an extremely small amount of the structural units derived from the aliphatic diol compound as the interconnecting agent. While having a skeleton similar to a conventional homopolycarbonate resin, the resin may achieve excellent qualities such as a low N value, a small content of heterologous units, and an excellent color tone.

Here, the heterologous units refer to units having a structure which may cause undesired effects. An example is branching point units that are present in a high proportion in polycarbonates obtained by a conventional melt method. Such heterologous structures may be present as repeating structures or randomly in the skeleton of the polycarbonate resin.

Specific examples of the heterologous units include, but are not limited to, those units having the following structures. In the following formulae, $R_{11}$, p, $R_{12}$, q and X are the same as $R_{11}$, p, $R_{12}$, q and X in Formula (II). Y indicates a bonding such as a hydrogen atom, a phenyl group, a methyl group or a unit of Formula (II).

production process contains structural units derived from the aliphatic diol compound, the ratio of the structural units derived from the aliphatic diol compound is not more than 1 mol %, and more preferably not more than 0.1 mol % relative to all the structural units in the highly polymerized aromatic polycarbonate resin.

In the process for producing highly polymerized aromatic polycarbonate resins of the invention, it is preferable that the raw material compounds such as the aromatic dihydroxy compounds, the aliphatic diol compounds and the carbonate bond-forming compounds have high chemical purity. While the production is feasible with chemical purity on a commercial or industrial level, the use of low-purity materials results in the occurrence of byproducts or heterologous skeleton structures derived from impurities. Consequently, it may be difficult to maintain properties inherent to polycarbonate resins, specifically, the obtainable resins or shaped articles may be markedly colored or exhibit poor properties such as thermal stability and strength.

The chemical purity of the aliphatic diol compound is preferably 70% or more, more preferably 80% or more, and particularly preferably 90% or more. The chemical purity of the carbonate bond-forming compound such as diphenyl carbonate is preferably 80% or more, more preferably 90% or more, and particularly preferably 95% or more. The chemical purity of the aromatic dihydroxy compound is

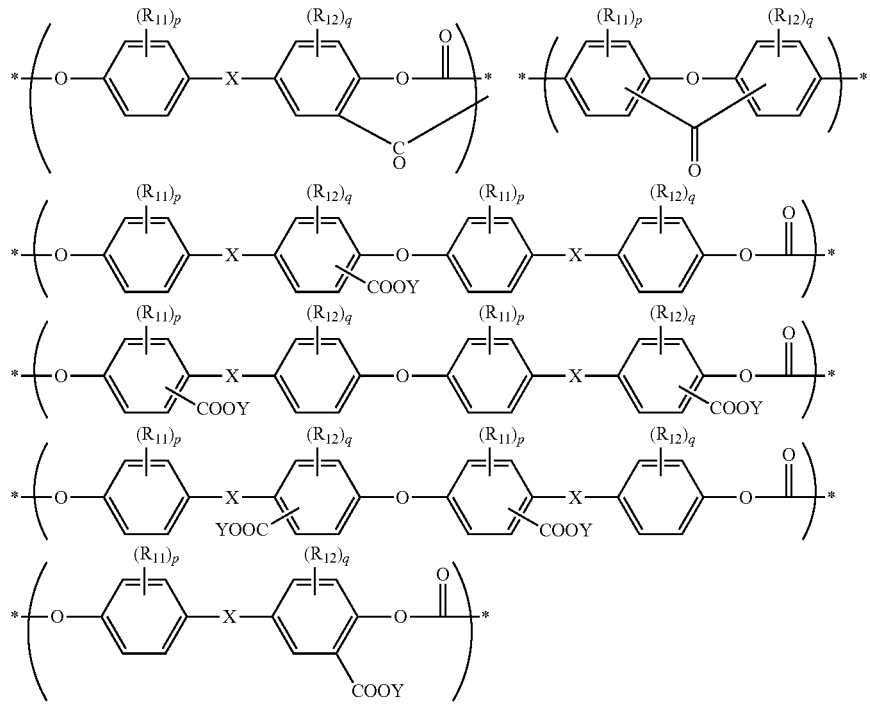

In the case where the skeleton of the highly polymerized aromatic polycarbonate resin obtained by the inventive preferably 90% or more, more preferably 95% or more, and particularly preferably 99% or more.

In some cases, the raw material compounds contain impurities such as chlorine, nitrogen, boron, alkali metals, alkaline earth metals, light metals and heavy metals, in addition to the impurities that decrease the chemical purity. It is preferable that the amounts of chlorine, nitrogen, boron, alkali metals, alkaline earth metals, light metals and heavy metals present in the raw material compounds be small.

Examples of the alkali metals include lithium, sodium, potassium, rubidium, cesium, and salts and derivatives thereof. Examples of the alkaline earth metals include beryllium, magnesium, calcium, strontium, barium, and salts and derivatives thereof. Examples of the light metals include titanium, aluminum, and salts and derivatives thereof.

Specific examples of the heavy metals include vanadium, chromium, manganese, iron, cobalt, nickel, copper, zinc, gallium, germanium, niobium, molybdenum, ruthenium, rhodium, palladium, silver, cadmium, indium, tin, antimony, tantalum, tungsten, osmium, iridium, platinum, gold, thallium, lead, bismuth, arsenic, selenium, tellurium, and salts and derivatives thereof.

The amounts of these impurities are preferably low in all the raw material compounds.

Preferably, the contents of impurities present in the aliphatic diol compound are not more than 3 ppm, more preferably not more than 2 ppm and still more preferably not more than 1 ppm for chlorine, not more than 100 ppm for nitrogen, and not more than 10 ppm, more preferably not more than 5 ppm, and still more preferably not more than 1 ppm for the alkali metals, the alkaline earth metals, titanium and the heavy metals (in particular, iron, nickel, chromium, zinc, copper, manganese, cobalt, molybdenum and tin).

Preferably, the contents of impurities present in the other raw materials (the aromatic dihydroxy compound and the carbonate bond-forming compound) are not more than 2 ppm, more preferably not more than 1 ppm and still more preferably not more than 0.8 ppm for chlorine, not more than 100 ppm for nitrogen, and not more than 10 ppm, more preferably not more than 5 ppm, and still more preferably not more than 1 ppm for the alkali metals, the alkaline earth metals, titanium and the heavy metals (in particular, iron, nickel, chromium, zinc, copper, manganese, cobalt, molybdenum and tin).

When present in large amounts, such impurity metals may exhibit a catalytic action to excessively accelerate the reaction or may cause a decrease in reactivity. As a result, the progress of the intended reaction may be inhibited and side reactions may take place to cause an increase in the amount of spontaneous branched structures or an unexpected increase of the N value. Further, the presence of such large amounts of metals may cause marked coloring of the obtainable resins or shaped articles or may cause a decrease in properties such as thermal stability.

The use of raw materials having higher purity makes it possible to further improve the color tone and the molecular weight retention rate (an indicator that shows the resistance of the resin to the decrease in molecular weight when the resin is held at high temperatures).

[4] Production Processes

Hereinbelow, there will be described in detail the conditions of the production process involving the aliphatic diol compound with a structure represented by Formula (g2).

(i) Addition of Aliphatic Diol Compound

In the production process of the invention, the aliphatic diol compound is admixed with the aromatic polycarbonate prepolymer, and the molecular weight-increasing reaction (transesterification) is carried out in a molecular weight-increasing reactor.

The amount of the aliphatic diol compound used is preferably 0.01 to 1.0 mol, more preferably 0.1 to 1.0 mol, and still more preferably 0.2 to 0.7 mol per 1 mol of all the molecular ends of the aromatic polycarbonate prepolymer. When, however, the aliphatic diol compound has a relatively low boiling point, the compound may be added in an amount larger than the above range in consideration of the possibility that part of the compound may be discharged out of the reaction system without participating in the reaction due to volatilization or the like depending on the reaction conditions. For example, the aliphatic diol compound may be added in an amount of up to 50 mol, preferably 10 mol, and more preferably 5 mol per 1 mol of all the molecular ends of the aromatic polycarbonate prepolymer.

The aliphatic diol compound may be mixed by any method without limitation. When the aliphatic diol compound that is used has a relatively high boiling point (a boiling point of about 350° C. or higher), the aliphatic diol compound is preferably supplied directly to the molecular weight-increasing reactor in high vacuum with a degree of vacuum being 10 torr or below (1333 Pa or below). The degree of vacuum is more preferably 2.0 torr or below (267 Pa or below), and still more preferably 0.01 to 1 torr (1.3 to 133 Pa or below). If the aliphatic diol compound is supplied to the molecular weight-increasing reactor while the degree of vacuum is insufficient, a byproduct (phenol) may cause a cleavage reaction of the prepolymer main chain to proceed, and the reaction mixture may require the extension of the reaction time to achieve a high molecular weight.

When, on the other hand, the aliphatic diol compound that is used has a relatively low boiling point (approximately a boiling point of less than 350° C.), the aromatic polycarbonate prepolymer and the aliphatic diol compound may be mixed with each other under a relatively moderate degree of vacuum. For example, the aromatic polycarbonate prepolymer and the aliphatic diol compound may be mixed with each other at nearly normal pressure to give a prepolymer mixture, and thereafter the prepolymer mixture may be subjected to the molecular weight-increasing reaction under reduced pressure conditions. In this manner, volatilization is suppressed to the minimum even in the case where the aliphatic diol compound has a relatively low boiling point, thus eliminating the need of excessive use of the compound.

(ii) Transesterification (Molecular Weight-Increasing Reaction)

The transesterification (the molecular weight-increasing reaction) of the aromatic polycarbonate prepolymer with the aliphatic diol compound preferably takes place at a temperature in the range of 240° C. to 320° C., more preferably 260° C. to 310° C., and still more preferably 280° C. to 310° C.

The degree of vacuum is preferably 13 kPa (100 torr) or below, more preferably 1.3 kPa (10 torr) or below, and still more preferably 0.013 to 0.67 kPa (0.1 to 5 torr).

Examples of the transesterification catalysts used in the transesterification include basic compound catalysts. Examples of the basic compound catalysts include alkali metal compounds, alkaline earth metal compounds and nitrogen-containing compounds.

Preferred examples of such compounds include alkali metal compounds and alkaline earth metal compounds such as organic acid salts, inorganic salts, oxides, hydroxides, hydrides and alkoxides; quaternary ammonium hydroxide and salts thereof; and amines. These compounds may be used singly, or two or more may be used in combination.

Specific examples of the alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium tetraphenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, sodium gluconate, salts of bisphenol A such as disodium salt, dipotassium salt, dicesium salt and dilithium salt, and salts of phenol such as sodium salt, potassium salt, cesium salt and lithium salt. Of these, preferred alkali metal compounds are sodium hydrogen carbonate, sodium carbonate, potassium carbonate and cesium carbonate.

Specific examples of the alkaline earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Specific examples of the nitrogen-containing compounds include quaternary ammonium hydroxides having an alkyl group and/or an aryl group such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases and basic salts such as ammonia, tetramethylammonium borohydride, tetrabutylammonium borohydride, tetrabutylammonium tetraphenylborate and tetraphenylammonium tetraphenylborate. Of these, a preferred nitrogen-containing compound is tetramethylammonium hydroxide.

Other preferred transesterification catalysts are salts of zinc, tin, zirconium or lead. These may be used singly, or two or more may be used in combination.

Specific examples of such transesterification catalysts include zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate and lead (IV) acetate.

These catalysts are used in a ratio of $1\times10^{-9}$ to $1\times10^{-3}$ mol, and preferably a ratio of $1\times10^{-7}$ to $1\times10^{-5}$ mol per 1 mol of the total of the aromatic dihydroxy compound.

When the production process is such that an aromatic polycarbonate prepolymer is produced by the reaction of starting materials, namely, an aromatic dihydroxy compound and a carbonate diester and the molecular weight of the prepolymer is increased continuously from the prepolymer production step, the catalyst used in the production of the aromatic polycarbonate prepolymer may be continuously used as the transesterification catalyst in the molecular weight-increasing step.

(iii) Cyclic Carbonate Removal Step

In the production process of the invention, it is preferable that the molecular weight of the aromatic polycarbonate prepolymer be increased by the molecular weight-increasing reaction while concurrently removing at least part of the cyclic carbonate that is by-produced in the reaction to the outside of the reaction system. The removal of the cyclic carbonate byproduct to the outside of the reaction system allows the molecular weight-increasing reaction of the aromatic polycarbonate prepolymer to proceed more efficiently.

For example, the cyclic carbonate may be removed in such a manner that the reaction system is heated to distill off a distillate containing the cyclic carbonate as well as other byproducts, for example, aromatic monohydroxy compounds such as phenol, and also the unreacted aliphatic diol compound. For example, the temperature for distilling off the distillate from the reaction system is 240 to 320° C., preferably 260 to 310° C., and more preferably 280 to 310° C.

At least part of the cyclic carbonate that is by-produced is removed. The perfect removal of the cyclic carbonate byproduct is most preferable but is generally difficult. It is acceptable that the removal is imperfect and the polycarbonate resin product contains the residual cyclic carbonate. The upper limit of the residual amount in the product is preferably 3000 ppm. That is, as will be described later, the production process involving the aliphatic diol compound with a structure represented by Formula (g2) affords a polycarbonate resin composition containing not more than 3000 ppm of a cyclic carbonate.

The cyclic carbonate that has been distilled off from the reaction system may be recovered and reused (recycled) through steps such as hydrolysis and purification. Similarly, the phenols that have been distilled off together with the cyclic carbonate may be recovered and may be reused by being supplied to diphenyl carbonate production steps.

(iv) Other Production Conditions

In the present invention, the transesterification of the aromatic polycarbonate prepolymer with the aliphatic diol compound preferably affords an aromatic polycarbonate resin which has a weight average molecular weight (Mw) higher than the weight average molecular weight (Mw) of the aromatic polycarbonate prepolymer by 5,000 or more, more preferably 10,000 or more, and still more preferably 15,000 or more.

The transesterification with the aliphatic diol compound may be performed using any known types of apparatuses or vessel materials. The reaction may be carried out continuously or batchwise. The reaction apparatus used in carrying out the reaction may be a vertical apparatus equipped with a stirring blade such as an anchor stirring blade, a Maxblend stirring blade or a helical ribbon stirring blade, a horizontal apparatus equipped with a blade such as a paddle blade, a lattice blade or a spectacle-shaped blade, or an extruder equipped with a screw. In a preferred embodiment, any of these reaction apparatuses are appropriately combined in consideration of the polymer viscosity. A preferred apparatus is one which has a rotational blade realizing high horizontal stirring efficiency and has a unit capable of creating reduced pressure conditions.

A more preferred apparatus is a twin-screw extruder or a horizontal reactor having a polymer seal and a devolatilization structure.

Preferred materials of the apparatuses are those materials which do not affect the color tone of the polymer, with examples including stainless steels such as SUS310, SUS316 and SUS304, nickel and nitride steel. It is appropriate that the inside of the apparatus (portions placed in contact with the polymer) be buffed, electrolytically polished, or plated with a metal such as chromium.

In the present invention, a catalyst deactivator may be added after the aromatic polycarbonate resin has attained an increase in molecular weight. It is generally preferable to deactivate the catalyst by the addition of a known acidic substance. Specific examples of such substances include aromatic sulfonic acids such as paratoluenesulfonic acid; aromatic sulfonate esters such as butyl paratoluenesulfonate; aromatic sulfonate salts such as tetrabutylphosphonium dodecylbenzenesulfonate salt and tetrabutylammonium paratoluenesulfonate salt; organic halides such as stearic acid chloride, butyric acid chloride, benzoyl chloride, toluenesulfonic acid chloride and benzyl chloride; alkyl sulfate salts such as dimethyl sulfate; phosphoric acids; and phosphorous acids.

Of these, the catalyst deactivator is preferably selected from the group consisting of paratoluenesulfonic acid, butyl paratoluenesulfonate, tetrabutylphosphonium dodecylbenzenesulfonate salt and tetrabutylammonium paratoluenesulfonate salt.

The catalyst deactivator may be admixed with the polycarbonate resin by a known method after the completion of the molecular weight-increasing reaction. For example, a method may be adopted in which the deactivator is mixed ers, lubricants, mold release agents, nucleating agents, plasticizers, fluidity improvers and antistatic agents.

Examples of the heat stabilizers include known agents such as triphenylphosphine (P-Ph$_3$).

Examples of the antioxidants include tris(2,4-di-tert-butylphenyl)phosphite, n-octadecyl-β-(4'-hydroxy-3',5'-di-tert-butylphenyl) propionate, pentaerythrityl-tetrakis[3-(3,5-di-tert-butyl-4-hydroxyphenyl)propionate], n-octadecyl-β-(4'-hydroxy-3',5'-di-tert-butylphenyl)propionate, 1,6-hexanediolbis[3-(3,5-di-tert-butyl-4-hydroxyphenyl) propionate, triethylene glycol-bis-3-(3-tert-butyl-4-hydroxy-5-methylphenyl propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-tert-butylphenyl)phosphite, tetrakis(2,4-di-tert-butylphenyl)-4,4'-biphenylene diphosphonite, tricresyl phosphite and 2,2-methylenebis(4,6-di-tert-butylphenyl)octyl phosphite. Of these, preferred compounds are tris(2,4-di-tert-butylphenyl)phosphite represented by the following Formula A, and n-octadecyl-β-(4'-hydroxy-3',5'-di-tert-butylphenyl)propionate represented by the following Formula B.

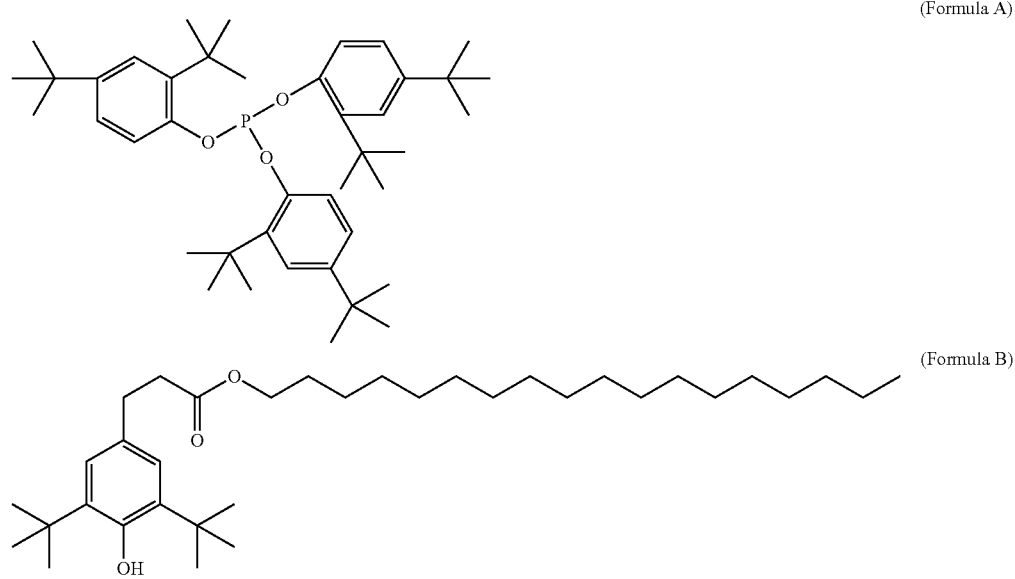

(Formula A)

(Formula B)

and dispersed with a high-speed mixer such as a tumbling mixer, a Henschel mixer, a ribbon blender or a super mixer and thereafter the mixture is melt kneaded with an extruder, a Banbury mixer, rolls or the like.

After the deactivation of the catalyst, a step may be performed in which low-boiling compounds in the polymer are removed by being volatilized at a temperature of 200 to 350° C. under a pressure of 0.013 to 0.13 kPa (0.1 to 1 torr). To perform this step, it is preferable to use a horizontal apparatus equipped with a stirring blade capable of excellent surface renewing performance such as a paddle blade, a lattice blade or a spectacle-shaped blade, or to use a thin-film evaporator.

A preferred apparatus is a twin-screw extruder or a horizontal reactor having a polymer seal and a bent structure.

In the invention, additives may be added, with examples including heat stabilizers, hydrolysis stabilizers, antioxidants, pigments, dyes, reinforcing agents, fillers, UV absorb- The additives may be admixed with the polycarbonate resin by a known method similarly to the catalyst deactivator. For example, a method may be adopted in which the components are mixed and dispersed with a high-speed mixer such as a tumbling mixer, a Henschel mixer, a ribbon blender or a super mixer and thereafter the mixture is melt kneaded with an extruder, a Banbury mixer, rolls or the like. The step of adding the additives may be performed simultaneously with or separately from the addition of the catalyst deactivator.

[5] Highly Polymerized Aromatic Polycarbonate Resins

By the production process of the invention involving the aliphatic diol compound with a structure represented by Formula (g2), a highly polymerized aromatic polycarbonate resin may be obtained which has a weight average molecular weight (Mw) of 30,000 to 100,000, preferably 30,000 to 80,000, and more preferably 35,000 to 75,000. In spite of its high molecular weight, the resin exhibits high fluidity. Thus, the resin is an excellent forming material with good forming properties that exhibits sufficient melt tension when used in applications such as blow molding and extrusion.

The above weight average molecular weight ensures that when the resin is used in applications such as injection molding, problems such as stringing are suppressed and satisfactory articles are obtained. Further, the obtainable shaped articles exhibit excellent properties such as mechanical properties and heat resistance. Furthermore, the decrease in the amounts of oligomers leads to an enhancement in properties such as organic solvent resistance. If, however, the weight average molecular weight is excessively high, it becomes difficult to injection mold the resin into precision parts or thin products, and the forming cycle time is increased to adversely affect production costs. Such problems may be remedied by approaches such as increasing the forming temperature, but high temperatures may give rise to problems such as gelation, the occurrence of heterologous structures and an increase in the N value.

In the highly polymerized aromatic polycarbonate resin according to the invention, the N value (the structural viscosity index) represented by the following Equation (1) is preferably 1.3 or less, more preferably 1.28 or less, and particularly preferably 1.25 or less.

$$N \text{ value}=(\log(Q160)-\log(Q10))/(\log 160-\log 10) \quad (1)$$

In Equation (1), Q160 is the melt flow volume per unit time (ml/sec) at 280° C. and 160 kg load (measured with CFT-500D manufactured by Shimadzu Corporation (the same applies hereinbelow) and calculated with respect to strokes of 7.0 to 10.0 mm), and Q10 is the melt flow volume per unit time (ml/sec) at 280° C. and 10 kg load (calculated with respect to strokes of 7.0 to 10.0 mm). The nozzle diameter is 1 mm, and the nozzle length is 10 mm.

The structural viscosity index "N value" is an indicator of the degree of branching of aromatic polycarbonate resins. The highly polymerized aromatic polycarbonate resin of the invention has a low N value. That is, the proportion of branched structures is low and the proportion of linear structures is high. In general, polycarbonate resins tend to show higher fluidity (a higher value of Q) with increasing proportion of branched structures provided that the molecular weights Mw are the same. In contrast, the highly polymerized aromatic polycarbonate resin of the invention achieves high fluidity (a high value of Q) while the N value is low.

Further, the highly polymerized aromatic polycarbonate resin obtained by the production process of the invention has good hue.

The hue of aromatic polycarbonate resins is generally evaluated based on YI values. Usually, the YI values of aromatic polycarbonate resins obtained by an interfacial polymerization method are 0.8 to 1.0. On the other hand, highly polymerized aromatic polycarbonates obtained by a melt polymerization method have YI values of 1.7 to 2.0 because of the decrease in quality associated with production steps. The highly polymerized aromatic polycarbonate resins obtained by the production process of the invention have similar YI values to the aromatic polycarbonates obtained by an interfacial polymerization method. That is, no decrease in hue is encountered.

The use of raw materials having higher purity makes it possible to further improve the color tone and the molecular weight retention rate (an indicator that shows the resistance of the resin to the decrease in molecular weight when the resin is held at high temperatures).

Specifically, the highly polymerized aromatic polycarbonate resin obtained by the production process of the invention may achieve a molecular weight (Mw) retention rate of not less than 50%, and more preferably not less than 70% after being tested by a thermal exposure test (at 360° C. for 60 minutes).

[6] Polycarbonate Resin Compositions

A polycarbonate resin composition of the invention is based on the highly polymerized aromatic polycarbonate resin obtained by the aforementioned production process of the invention and contains a cyclic carbonate represented by the following Formula (h2). That is, the highly polymerized aromatic polycarbonate resin obtained by the aforementioned production process of the invention may contain a small amount of a residual cyclic polycarbonate that has remained after the removal of the cyclic carbonate by-produced during the production step.

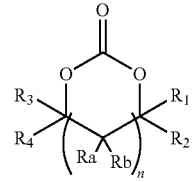

(h2)

The details and preferred embodiments of the cyclic carbonate represented by Formula (h2) are as mentioned hereinabove.

In the polycarbonate resin composition of the invention, the content of the cyclic carbonate represented by Formula (h2) is not more than 3000 ppm, preferably not more than 1000 ppm, more preferably not more than 500 ppm, and particularly preferably not more than 300 ppm. The lower limit of the content of the cyclic polycarbonate is not particularly limited. Ideally, the content is 0% and is usually below the detection limit, but is preferably not less than 0.0005 ppm. The above upper limit of the content of the cyclic carbonate ensures that problems such as a decrease in resin strength are effectively suppressed.

The polycarbonate resin composition of the invention may contain the catalyst deactivator used in the production steps. The presence of the catalyst deactivator further enhances the thermal stability of the resin composition.

In the polycarbonate resin composition of the invention, the content of the catalyst deactivator is not particularly limited, but is preferably not less than 3 ppm, and more preferably not less than 5 ppm. When the content of the catalyst deactivator is 3 ppm or more, thermal stability is markedly enhanced.

The upper limit of the content of the catalyst deactivator is not particularly limited, but the content is preferably not more than 30 ppm, and more preferably not more than 20 ppm.

Specific examples of the catalyst deactivators that enhance thermal stability include aromatic sulfonic acids such as paratoluenesulfonic acid; aromatic sulfonate esters such as butyl paratoluenesulfonate; aromatic sulfonate salts such as tetrabutylphosphonium dodecylbenzenesulfonate salt and tetrabutylammonium paratoluenesulfonate salt; organic halides such as stearic acid chloride, butyric acid chloride, benzoyl chloride, toluenesulfonic acid chloride and benzyl chloride; alkyl sulfate salts such as dimethyl sulfate; phosphoric acids; and phosphorous acids.

Of these, the catalyst deactivator is preferably selected from the group consisting of paratoluenesulfonic acid, butyl paratoluenesulfonate, tetrabutylphosphonium dodecylbenzenesulfonate salt and tetrabutylammonium paratoluenesulfonate salt.

The polycarbonate resin composition of the invention may further contain additives such as heat stabilizers, hydrolysis stabilizers, antioxidants, pigments, dyes, reinforcing agents, fillers, UV absorbers, lubricants, mold release agents, nucleating agents, plasticizers, fluidity improvers and antistatic agents.

Examples of the heat stabilizers include known agents such as triphenylphosphine (P-Ph$_3$).

Examples and preferred embodiments of the antioxidants are as mentioned hereinabove.

[7] Shaped Articles

The highly polymerized aromatic polycarbonate resins and the polycarbonate resin compositions obtained by the process of the invention may be suitably used in applications such as various shaped articles, sheets and films obtained by forming methods such as injection molding, blow molding (hollow molding), extrusion, injection blow molding, rotational molding and compression molding. When used in these applications, the resins of the invention may be used as such or in the form of blends with other polymers. Processing such as hard coating or lamination may be suitably performed depending on the use purpose.

Particularly preferably, the highly polymerized aromatic polycarbonate resins and the polycarbonate resin compositions obtained by the process of the invention may be used in extrusion, blow molding, injection molding and the like. Examples of the obtainable shaped articles include extruded articles, hollow molded articles, precision parts and thin injection molded articles. The thickness of precision parts and thin injection molded articles is preferably 1 μm to 3 mm.

Specific examples of the shaped articles include, but are not limited to, optical media such as compact discs, digital video discs, mini discs and magneto-optical discs; optical communication media such as optical fibers; optical components such as automobile head lamp lenses and camera lenses; optical instrument components such as siren light covers and illumination lamp covers; window glass alternatives for vehicles such as trains and automobiles; window glass alternatives for houses; sun-lighting components such as sunroofs and greenhouse roofs; lenses and chassises of goggles, sunglasses and eyeglasses; chassises of OA equipments such as copying machines, facsimiles and personal computers; chassises of home electric appliances such as televisions and microwaves; electronic parts such as connectors and IC trays; protective items such as helmets, protectors and protective masks; household products such as nursing bottles, dishes and trays; medical products such as artificial dialysis cases and artificial dentures; and general groceries such as packaging materials, writing materials and stationery products.

The highly polymerized aromatic polycarbonate resins and the polycarbonate resin compositions obtained by the inventive process may be particularly suited for use in the following articles requiring high strength and high precision.

Automobile parts such as head lamp lenses, meter panels, sunroofs, alternatives to glass window and outer panels.

Various films in devices such as liquid crystal displays, light guide plates and optical disc substrates.

Building materials such as transparent sheets.

Structural parts such as chassises of personal computers, printers and liquid crystal televisions.

EXAMPLES

Hereinbelow, the present invention will be described by presenting Examples without limiting the scope of the invention to such Examples. In Examples, properties were measured by the following methods or with the following apparatuses.

1) Polystyrene-equivalent weight average molecular weight (Mw): A calibration curve was drawn by GPC using chloroform as a developing solvent and polystyrenes of known molecular weight (molecular weight distribution=1) as standards. Based on the calibration curve, the GPC retention time was studied to calculate the weight average molecular weight of aromatic polycarbonate prepolymers (in the table, written as "prepolymer molecular weight (Mw)") and the weight average molecular weight of highly polymerized aromatic polycarbonate resins (in the table, written as "Mw"). Specifically, the molecular weight was calculated in the following manner.

A calibration curve was drawn by GPC using chloroform as a developing solvent and polystyrenes of known molecular weight (molecular weight distribution=1) as standards ("PStQuick MP-M" manufactured by TOSOH CORPORATION). The standard polystyrenes were analyzed, and the elution time of each peak and the molecular weight were plotted. By tertiary approximation, a calibration curve was obtained. The weight average molecular weight (Mw) was calculated using the following equation.

$$Mw = \Sigma(W_i \times M_i) \div \Sigma(W_i)$$

Here, i indicates an i-th dividing point of the divisions of the molecular weights M, $W_i$ is the weight of an i-th fraction, and $M_i$ is the molecular weight of an i-th fraction. The molecular weight M is a value of the polystyrene molecular weight at the same elution time in the calibration curve.

[Measurement Conditions]

Apparatus: HLC-8320GPC manufactured by TOSOH CORPORATION

Columns: Guard column TSKguardcolumn SuperMPHZ-M×1

Analysis columns: TSKgel SuperMultipore HZ-M×3

Solvent: HPLC grade chloroform

Amount of injection: 10 μL

Sample concentration: 0.2 w/v % HPLC grade chloroform solution

Solvent flow rate: 0.35 ml/min

Measurement temperature: 40° C.

Detector: RI

2) Terminal hydroxyl group concentration (ppm): A complex of the prepolymer with titanium tetrachloride in a methylene chloride solution was analyzed by UV/visible spectroscopy (546 nm). In other cases, the terminal hydroxyl group concentration was determined by analyzing $^1$H-NMR results.

In the case of $^1$H-NMR, the terminal hydroxyl group concentration in the prepolymer was determined by dissolving 0.05 g of a resin sample in 1 ml of deuterated chloroform (containing 0.05 w/v % TMS) and analyzing the solution by $^1$H-NMR at 23° C. Specifically, the terminal hydroxyl group concentration (the OH concentration) in the PP was calculated from the integral ratio of the hydroxyl group peak at 4.7 ppm to the peaks of phenyl and phenylene groups (terminal phenyl groups and BPA skeleton-derived phenylene groups) at near 7.0 to 7.5 ppm.

Details of the $^1$H-NMR measurement conditions are as follows.

Apparatus: LA-500 (500 MHz) manufactured by JEOL Ltd.

Nucleus of interest: $^1$H

Relaxation delay: 1 s x_angle: 45 deg x_90_width: 20 μs x_plus: 10 μs

Scan: 500 times

3) Terminal phenyl group concentration (terminal Ph concentration; mol %): The concentration was obtained based on $^1$H-NMR analysis results using the following equation.

Terminal Ph concentration (mol %)=(Terminal Ph hydrogen area ratio/2)/(Terminal Ph hydrogen area ratio/2+Ph hydrogen area ratio/8)×100

Specifically, 0.05 g of a resin sample was dissolved in 1 ml of deuterated chloroform (containing 0.05 w/v % TMS), and the amount of terminal phenyl groups in the PP and the terminal phenyl group concentration were determined by measuring a $^1$H-NMR spectrum at 23° C. and calculating the integral ratio of the peak of terminal phenyl groups at near 7.4 ppm to the peak of phenylene groups (derived from a BPA skeleton) at near 7.0 to 7.3 ppm. Details of the $^1$H-NMR measurement conditions are as described hereinabove.

4) Fluidity (value Q): The value Q indicates a flow volume (ml/sec) of a molten resin. This property was evaluated with respect to a sample that had been dried at 130° C. for 5 hours, by measuring the melt flow volume per unit time at 280° C. and 160 kg load with Koka (The Society of Polymer Science, Japan) flow tester CFT-500D (manufactured by Shimadzu Corporation).

5) N value: An aromatic polycarbonate (a sample) that had been dried at 130° C. for 5 hours was analyzed with Koka (The Society of Polymer Science, Japan) flow tester CFT-500D (manufactured by Shimadzu Corporation) to determine the melt flow volume per unit time at 280° C. and 160 kg load as Q160 and the melt flow volume per unit time at 280° C. and 10 kg load as Q10. The N value was calculated from these values using the following Equation (1).

$$N \text{ value}=(\log(Q160)-\log(Q10))/(\log 160-\log 10) \quad (1)$$

6) Content of cyclic carbonate in resin: A resin sample weighing 10 g was dissolved in 100 ml of dichloromethane, and the solution was dropped to 1000 ml of methanol while performing stirring. The precipitates were filtered off, and the solvent of the filtrate was removed. The resultant solid was analyzed by GC-MS under the following measurement conditions. In the measurement under the following conditions, the detection limit was 0.0005 ppm. In the table, the content is written as "cyclic carbonate (ppm)".

GC-MS Measurement Conditions:
Measurement apparatus: Agilent HP6890/5973MSD
Column: capillary column DB-5MS, 30 m×0.25 mm (I.D.), film thickness 0.5 μm
Heating conditions: 50° C. (5 min hold)-300° C. (15 min hold), 10° C./min
Inlet temperature: 300° C., Amount of injection: 1.0 μl (split ratio 25)
Ionization method: EI method
Carrier gas: He, 1.0 ml/min
Aux temperature: 300° C.
Mass scan range: 33-700
Solvent: HPLC chloroform
Internal standard: 1,3,5-trimethylolphenol 7) Thermal exposure test of resin: A sample resin weighing 1 g was placed into a test tube. In a nitrogen-purged glove box (oxygen concentration 0.0%), the sample was dried for 2 hours using a block heater set at 120° C. Subsequently, the block heater was set at 360° C. and the sample in the glove box was held at the temperature for 60 minutes. The rate (%) of retention of the molecular weight (Mw) after the thermal exposure test relative to before the test, and the change in YI value were measured.

This test simulates a thermal history at a maximum level of general forming temperatures that will be experienced by polycarbonates in applications such as precision forming in which the resin is required to maintain a low melt viscosity. The residence time as long as 60 minutes assumes the longest residence time that is expected in the actual forming processes including troubles such as apparatus breakdown.

8) Hue (YI value) of resin before and after thermal exposure test: A resin sample weighing 1 g was dissolved in 30 ml of methylene chloride. The solution was placed into a cell having an optical path length of 20 mm and was analyzed on a spectral color difference meter ("SE-2000" manufactured by NIPPON DENSHOKU INDUSTRIES CO., LTD.), thereby measuring the YI value.

Aliphatic diol compounds used in Examples and Comparative Examples below had a chemical purity of 98 to 99%, a chlorine content of not more than 0.8 ppm, and contents of alkali metals, alkaline earth metals, titanium and heavy metals (iron, nickel, chromium, zinc, copper, manganese, cobalt, molybdenum and tin) of not more than 1 ppm each. Aromatic dihydroxy compounds and carbonate diesters had a chemical purity of not less than 99%, a chlorine content of not more than 0.8 ppm, and contents of alkali metals, alkaline earth metals, titanium and heavy metals (iron, nickel, chromium, zinc, copper, manganese, cobalt, molybdenum and tin) of not more than 1 ppm each.

In Examples below, 2,2-bis(4-hydroxyphenyl)propane, prepolymer, hydroxyl group and phenyl group are sometimes written as "BPA", "PP", "OH group" and "Ph", respectively.

Example 1

A 50 L SUS reactor equipped with a stirrer and a distillation apparatus was loaded with 10,001.0 g (43.808 mol) of 2,2-bis(4-hydroxyphenyl)propane, 10,557 g (49.281 mol) of diphenyl carbonate, and 0.5 μmol/mol-BPA of cesium carbonate ($Cs_2CO_3$) as a catalyst (the number of moles of the catalyst was calculated relative to the moles of 2,2-bis(4-hydroxyphenyl)propane). The atmosphere in the system was purged with nitrogen. The degree of vacuum was adjusted to 27 kPa (200 torr), and the heat medium temperature was set at 205° C. The raw materials were melted by heating, and thereafter stirring was performed.

Thereafter, the heat medium temperature was gradually increased while the degree of vacuum was decreased at the same time, and transesterification was performed while phenol that was distilled from the reaction system was condensed in a condenser tube and was removed. The system was finally brought to a temperature of 260° C. and a degree of vacuum of 0.13 kPa (1 torr) or below in approximately 4 hours, and was held under such conditions for 1 hour. A portion of the polycarbonate prepolymer sampled during the above process had a weight average molecular weight (Mw) of 22,000, a terminal hydroxyl group concentration of 60 ppm, and a terminal phenyl concentration (a terminal Ph concentration) of 5.0 mol %.

The terminal hydroxyl group concentration is a value calculated by $^1$H-NMR and indicates the concentration of terminal hydroxyl groups present in all the polymer molecules. The terminal Ph concentration is a value calculated by $^1$H-NMR and indicates the concentration of terminal phenyl groups (including phenyl groups substituted with a hydroxyl group) relative to all the phenylene groups and the phenyl terminals.

Subsequently, nitrogen was supplied to the reaction system and the pressure was increased to normal pressure.

Thereafter, the temperature was raised to 285° C. To the reaction system, 209.53 g (1.308 mol) of 2-butyl-2-ethyl-propane-1,3-diol (BEPD) as an aliphatic diol compound was added, and the mixture was stirred. The mixture was kneaded by stirring for 10 minutes at normal pressure while maintaining the heat medium temperature at 285° C. The degree of vacuum was decreased to 0.13 kPa (1 torr) or below in 30 minutes, and the mixture was stirred for another 1 hour and 40 minutes.

Phenol, cyclic carbonate (5-butyl-5-ethyl-1,3-dioxan-2-one) and unreacted 2-butyl-2-ethylpropane-1,3-diol (BEPD) that were distilled from the reaction system were condensed in a condenser tube and were removed. Thus, a polycarbonate resin was obtained which had a weight average molecular weight (Mw) of 62,000, an N value of 1.23, and a content of cyclic carbonate (5-butyl-5-ethyl-1,3-dioxan-2-one) of 24 ppm.

The resin obtained above was dried and was then kneaded in an extruder together with 5 ppm of butyl paratoluenesulfonate to deactivate the catalyst. The resultant resin had a YI value of 0.6. A 1 g portion of the resin was placed into a test tube. In a nitrogen-purged glove box (oxygen concentration 0.0%), the resin was dried for 2 hours using a block heater set at 120° C. Subsequently, the block heater was set at 360° C. and the resin in the glove box was held at the temperature for 60 minutes. As a result, the rate (%) of retention of the molecular weight (Mw) after the thermal exposure test relative to before the test was 100%, and the change in YI value was +2.4.

Example 2

The procedures of Example 1 were repeated to obtain a polycarbonate resin containing 24 ppm of cyclic carbonate (5-butyl-5-ethyl-1,3-dioxan-2-one).

The resin obtained was dried and was then kneaded in an extruder together with 5 ppm of butyl paratoluenesulfonate (p-TSB) as a catalyst deactivator, 200 ppm of tris-(2,4-di-tert-butylphenyl)phosphite (Formula A) as an antioxidant and 100 ppm of triphenylphosphine as a heat stabilizer. The resultant resin had a YI value of 0.6.

A 1 g portion of the deactivated resin was placed into a test tube. In a nitrogen-purged glove box (oxygen concentration 0.0%), the resin was dried for 2 hours using a block heater set at 120° C. Subsequently, the block heater was set at 360° C. and the resin in the glove box was held at the temperature for 60 minutes. As a result, the rate (%) of retention of the molecular weight (Mw) after the thermal exposure test relative to before the test was 100%, and the change in YI value was +2.4.

Example 3

The procedures of Example 1 were repeated to obtain a polycarbonate resin containing 24 ppm of cyclic carbonate (5-butyl-5-ethyl-1,3-dioxan-2-one).

The resin obtained was dried and was then kneaded in an extruder together with 5 ppm of butyl paratoluenesulfonate (p-TSB) as a catalyst deactivator, and 200 ppm of tris-(2,4-di-tert-butylphenyl)phosphite (Formula A) and 1000 ppm of n-octadecyl-β-(4'-hydroxy-3',5'-di-tert-butylphenyl)propionate (Formula B) as antioxidants. The resultant resin had a YI value of 0.6.

A 1 g portion of the deactivated resin was placed into a test tube. In a nitrogen-purged glove box (oxygen concentration 0.0%), the resin was dried for 2 hours using a block heater set at 120° C. Subsequently, the block heater was set at 360° C. and the resin in the glove box was held at the temperature for 60 minutes. As a result, the rate (%) of retention of the molecular weight (Mw) after the thermal exposure test relative to before the test was 100%, and the change in YI value was +2.4.

Example 4

A 50 L SUS reactor equipped with a stirrer and a distillation apparatus was loaded with 10,000.6 g (43.807 mol) of 2,2-bis(4-hydroxyphenyl)propane, 10,560 g (49.295 mol) of diphenyl carbonate, and 0.5 μmol/mol-BPA of cesium carbonate as a catalyst (the number of moles of the catalyst was calculated relative to the moles of 2,2-bis(4-hydroxyphenyl) propane). The atmosphere in the system was purged with nitrogen. The degree of vacuum was adjusted to 27 kPa (200 torr), and the heat medium temperature was set at 205° C. The raw materials were melted by heating, and thereafter stirring was performed.

Thereafter, the heat medium temperature was gradually increased while the degree of vacuum was decreased at the same time, and transesterification was performed while phenol that was distilled from the reaction system was condensed in a condenser tube and was removed. The system was finally brought to a temperature of 260° C. and a degree of vacuum of 0.13 kPaA (1 torr) or below in approximately 4 hours, and was held under such conditions for 1 hour. The resultant polycarbonate prepolymer had a weight average molecular weight (Mw) of 22,000, a terminal hydroxyl group concentration of 70 ppm, and a terminal phenyl concentration (a terminal Ph concentration) of 5.0 mol %.

The terminal hydroxyl group concentration is a value calculated by $^1$H-NMR and indicates the concentration of terminal hydroxyl groups present in all the polymer molecules. The terminal Ph concentration is a value calculated by $^1$H-NMR and indicates the concentration of terminal phenyl groups (including phenyl groups substituted with a hydroxyl group) relative to all the phenylene groups and the phenyl terminals.

A 300 cc four-necked flask equipped with a stirrer and a distillation apparatus was loaded with 30.3724 g of the polycarbonate prepolymer, and the prepolymer was melted by heating at 280° C. As an aliphatic diol compound, 0.2963 g of 2,2-dimethoxy-propane-1,3-diol was added at a jacket temperature of 280° C. and normal pressure. The mixture was kneaded by stirring for 3 minutes.

Subsequently, the pressure was adjusted to 0.04 kPa (0.3 torr) and the mixture was kneaded by stirring at 280° C. for 70 minutes, thereby performing transesterification.

Phenol, cyclic carbonate (2,2-dimethoxy-1,3-dioxan-2-one) and unreacted 2,2-dimethoxy-propane-1,3-diol that were distilled from the reaction system were condensed in a condenser tube and were removed. Thus, a polycarbonate resin was obtained which had a weight average molecular weight (Mw) of 55,000, an N value of 1.22, and a content of cyclic carbonate (2,2-dimethoxy-1,3-dioxan-2-one) of 100 ppm.

TABLE 1

|  | Example 1 | Example 2 | Example 3 | Example 4 |
|---|---|---|---|---|
| BPA (g) | 10001.0 | 10001.0 | 10001.0 | 10000.6 |
| BPA (mol) | 43.808 | 43.808 | 43.808 | 43.807 |
| DPC (g) | 10557 | 10557 | 10557 | 10560 |
| DPC (mol) | 49.281 | 49.281 | 49.281 | 49.295 |
| DPC/BPA molar ratio | 1.125 | 1.125 | 1.125 | 1.125 |
| Prepolymer molecular weight (Mw) | 22000 | 22000 | 22000 | 22000 |
| Terminal hydroxyl group concentration (ppm) | 60 | 60 | 60 | 70 |
| Terminal phenyl group concentration (mol %) | 5.0 | 5.0 | 5.0 | 5.0 |
| Aliphatic diol compound | BEPD | BEPD | BEPD | ** |
| Amount of diol (g) | 209.53 | 209.53 | 209.53 | 0.2963 |
| Amount of diol (mol) | 1.308 | 1.308 | 1.308 | |
| Mw | 62000 | 62000 | 62000 | 55000 |
| Cyclic carbonate (ppm) | 24 | 24 | 24 | 100 |
| N value | 1.23 | 1.23 | 1.23 | 1.22 |
| Catalyst deactivator p-TSB (ppm) | 5 | 5 | 5 | — |
| Antioxidant Formula A (ppm) | — | 200 | 200 | — |
| Antioxidant Formula B (ppm) | — | — | 1000 | — |
| Molecular weight retention rate (%) | 100 | 100 | 100 | — |
| YI value | 0.6 | 0.6 | 0.6 | — |
| Change in YI value | 2.4 | 2.4 | 2.4 | — |

** 2,2-Dimethoxy-propane-1,3-diol
p-TSB: butyl p-toluenesulfonate
Antioxidant Formula A: tris-(2,4-di-t-butylphenyl) phosphite
Antioxidant Formula B: n-octadecyl-β-(4'-hydroxy-3',5'-di-t-butylphenyl) propionate

INDUSTRIAL APPLICABILITY

By the inventive process for producing a highly polymerized aromatic polycarbonate resin using an aliphatic diol compound with a structure represented by Formula (g2), a polycarbonate resin may be obtained which not only has high molecular weight, high fluidity and excellent quality but also has the same structure as synthesized by an interfacial method and exhibits good heat resistance.

The highly polymerized aromatic polycarbonate resin of the invention obtained by the inventive process may be used as an alternative to conventional general polycarbonate resins or compositions to realize advantages such as enhanced forming cycles and low forming temperatures. Thus, the highly polymerized aromatic polycarbonate resin may be suitably used in applications such as various shaped articles, sheets and films obtained by forming methods such as injection molding, blow molding, extrusion, injection blow molding, rotational molding and compression molding.

Further, other advantages such as the saving of power consumption are expected to allow for the reduction of environmental loads and article production costs. Thus, the inventive resins are economically efficient and environmentally friendly materials. In particular, the inventive resins have superior thermal stability and exhibit a high molecular weight (Mw) retention rate (for example, 50% or more) and a small change in YI value (for example, +25 or less) even when the resins are exposed to a prolonged thermal history at a maximum level of general forming temperatures that will be experienced by polycarbonates. Accordingly, for example, the resins are particularly suited for use in applications such as precision forming in which the resins are required to maintain a low melt viscosity.

The entire contents of the disclosure of Japanese Patent Application No. 2012-252793 are incorporated in the present specification by reference.

All the documents, patent applications and technical standards described in the present specification are incorporated in the present specification by reference with the same extent that these documents, patent applications and technical standards are specifically and individually described to be incorporated herein by reference.

The invention claimed is:

1. A process for producing a highly polymerized aromatic polycarbonate resin comprising a highly polymerizing step of reacting an aromatic polycarbonate prepolymer with an aliphatic diol compound represented by the following Formula (g2) in the presence of a transesterification catalyst to obtain a highly polymerized aromatic polycarbonate resin:

(g2)

wherein, in Formula (g2), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom; $R_1$ to $R_4$ each independently represent a hydrogen atom, a halogen atom, or a linear or branched alkyl group with 1 to 5 carbon atoms; and n represents an integer of 0 to 30.

2. The process according to claim 1, wherein n in Formula (g2) is an integer of 1 to 6.

3. The production process according to claim 1, wherein the aliphatic diol compound represented by Formula (g2) is an aliphatic diol compound represented by the following Formula (g3):

(g3)

wherein, in Formula (g3), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

4. The process according to claim 1, further comprising a cyclic carbonate removal step of removing at least part of a cyclic carbonate by-produced in the molecular weight-increasing step to the outside of the reaction system, the cyclic carbonate being represented by the following Formula (h2):

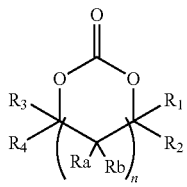

(h2)

wherein, in Formula (h2), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom; $R_1$ to $R_4$ each independently represent a hydrogen atom, a halogen atom, or a linear or branched alkyl group with 1 to 5 carbon atoms; and n represents an integer of 0 to 30.

5. The process according to claim 4, wherein the cyclic carbonate represented by Formula (h2) is a compound represented by the following Formula (h3):

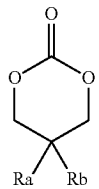

(h3)

wherein, in Formula (h3), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

6. The process according to claim 1, wherein the aliphatic diol compound is used in an amount of 0.01 to 1.0 mol per 1 mol of total terminal amount of the unreacted aromatic polycarbonate prepolymer in the highly polymerizing step.

7. A polycarbonate resin composition comprising the highly polymerized aromatic polycarbonate resin obtained by the process according to claim 1 and from 0.0005 to not more than 3000 ppm of a cyclic carbonate represented by the following Formula (h2):

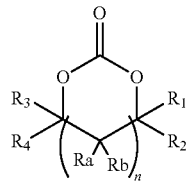

(h2)

wherein, in Formula (h2), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom; $R_1$ to $R_4$ each independently represent a hydrogen atom, a halogen atom, or a linear or branched alkyl group with 1 to 5 carbon atoms; and n represents an integer of 0 to 30.

8. A polycarbonate resin composition comprising the highly polymerized aromatic polycarbonate resin obtained by the process according to claim 1 and from 0.0005 to not more than 3000 ppm of a cyclic carbonate represented by the following Formula (h3):

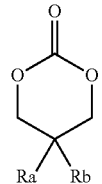

(h3)

wherein, in Formula (h3), Ra and Rb each independently represent a halogen atom, a cycloalkyl group with 3 to 30 carbon atoms optionally having an oxygen atom or a halogen atom, or an alkoxy group with 1 to 15 carbon atoms optionally having an oxygen atom or a halogen atom.

9. The polycarbonate resin composition according to claim 7, further comprising not less than 3 ppm of a catalyst deactivator.

10. The polycarbonate resin composition according to claim 9, wherein the catalyst deactivator is selected from the group consisting of aromatic sulfonic acids, aromatic sulfonate esters, organic halides, alkyl sulfate salts, phosphoric acids and phosphorous acids.

11. The polycarbonate resin composition according to claim 9, wherein the catalyst deactivator is selected from the group consisting of paratoluenesulfonic acid, butyl paratoluenesulfonate, tetrabutylphosphonium dodecylbenzenesulfonate salt and tetrabutylammonium paratoluenesulfonate salt.

* * * * *